United States Patent Office 2,819,228
Patented Jan. 7, 1958

2,819,228

EMULSIFYING COMPOSITION

M. Benjamin Dell, Morristown, N. J., assignor to The Patent and Licensing Corporation, New York, N. Y., a corporation of Massachusetts No Drawing. Application August 26, 1953
Serial No. 376,748

5 Claims. (Cl. 252—357)

The present invention relates to an improved emulsifying agent and to a method of preparing emulsions therewith. More specifically, the invention relates to a modification of a solid emulsifier.

Emulsions prepared with a solid emulsifier such as clay, have certain properties which are not obtained using other types of emulsifiers. Compared with emulsions made with soap-type emulsifiers, the emulsions made with solid emulsifiers are more stable toward precipitating cations such as calcium and are less affected by electrolytic action during storage. Moreover, dried films prepared from these emulsions are more resistant to flow at elevated temperatures. In certain cases, the particle size of the dispersed phase in these emulsions is much greater than that in corresponding emulsions using soap emulsifiers. While this results in greater instability of the emulsion, the larger particle size is advantageous where it is desired to produce a film which is highly permeable to water during drying.

In the past, only a limited number of materials such as asphalts and coal tars, have been emulsified using solid emulsifiers. For certain purposes it is desirable to emulsify certain resins, rubbers and wax, primarily with solid emulsifiers.

It is an object of the present invention to provide an improved emulsifier.

It is a further object of the present invention to provide an improved emulsifier which is basically solid.

It is a further object of the present invention to provide an improved emulsifier containing clay as a principal emulsifying agent.

It is a further object of the present invention to provide an improved process for emulsification utilizing a solid as the principal emulsifying ingredient.

These and other objects are attained by the present invention which relates to an emulsifier comprising a negatively charged solid emulsifying agent and a minor amount of a cationic surface active agent.

The solid emulsifying agents which have been found particularly suitable are negatively charged clays such as ball clay, kaolin clay, and bentonite.

While the proportions of the solid negatively charged emulsifying agent to the cationic surface active agent are not particularly critical, the amount of cationic agent is very small, so that the cationic agent by itself is not the emulsifying agent. The ratio of cationic agent to clay is preferably in the range 0.001 to 0.01 per part of clay.

The material to be emulsified in water includes asphalt and coal tar pitch as well as various insoluble liquid or liquifiable materials as resins, rubbers, and waxes, which are susceptible of emulsification by other means including terpene, nylon, ethylene, butadiene styrene, butadiene acrylonitrile and other polymers as well as beeswax, paraffin, microcrystalline, carnauba, and other waxes.

The cationic promoter may be any cationic surface active agent. Of these, it has been found preferable to use an amine known commercially as "Armeen H. T. D.," which is approximately 25% hexadecyl amine, 70% octadecyl and 5% octadecenyl amine. The cationic surface active agents are illustrated by the following:

A. Aliphatic amines and their derivatives.
   Dodecylamine
B. Homologs of aromatic amines having fatty chains.
   Dodecylaniline
C. Fatty amides derived from aliphatic diamines.
   Undecylimidazoline
D. Fatty amides derived from disubstituted diamines.
   Oleylaminodiethylamine
E. Quaternary ammonium salts and hydrates.
   Triethyl cetyl ammonium iodide
F. Amides obtained from amino alcohols and their quaternary ammonium derivatives.
   Dimethylstearyl hydroxyethyl ammonium
G. Quaternary ammonium bases derived from the fatty amides of disubstituted diamines.
H. Fatty amides derived from benzimidazolines.

$$\text{benzimidazoline structure with alkyl groups and } C-(CH_2)_n-R$$

I. Basic pyridinium compounds and their salts.
   Octadecyl methylene pyridinium acetate
J. Basic sulfonium, phosphonium and antimonium compounds.
   Methyl sulfate of dimethyloctadecyl sulfonium
K. Betaine compounds of quaternary ammonium.
   Hydrochloride of dimethyloctadecylmethyl aminoacetate
L. Dimethylphenylbenzyl ammonium chloride.
M. Urethane or basic salts of ethylene diamine.
   Menthol diurethane hydrochloride
N. Polyethylene diamines and their quaternary ammonium derivatives.
O. Polypropanol polyethanolamines.

EXAMPLE I

All equipment should be clean to prevent discoloration of the emulsion. The water used should be substantially free of sulfur compounds.

*Preparation of master batch*

|  | Parts |
|---|---|
| Polyisobutene (GRI-17) | 96.5 |
| Microcrystalline wax (M. P.—180° F., 30 Pen. at 77° F.) | 53.5 |

The polyisobutene was placed in a slightly warm Banbury mixer. The batch was mixed until the temperature rose to 250–300° F. and then about ¼ of the total wax was added. This was repeated 3 times, the wax being added only when the temperature was between 250 and 300° F.

*Preparation of emulsion*

|  | Parts |
|---|---|
| Master batch | 150 |
| Microcrystalline wax | 236 |
| Alkyl amine (Armeen H. T. D.) | 0.2 |
| Clay slip at 210° F.: | |
|     77.1 parts of kaolin clay (Crossman clay) | |
|     154.2 parts water | |
| Lignin sulphonate: | |
|     0.25 part of lignin sulphonate (Marasperse N) was dissolved in 1 part of water heated between 140 and 150° F. | |
| Water | 223 |

The master batch was mixed with about 45 parts wax in a Baker-Perkins dispersion mixer heated to about 100 to 120° F. When a homogeneous blend was produced, 45 parts more of wax were added. As soon as the blend again became homogeneous, the remainder of the wax was added. After waiting several minutes and then raising the temperature of the blend to 195–200° F., the alkyl amine was added. At this point the mixer was stopped and the entire clay slip quickly added. The mixer was immediately started and the temperature maintained at 180° F. after which the blend inverted. After a few minutes the mixture assumed a homogeneous appearance and part of the water at 210° F. was added gradually for several minutes. Thereafter, the rest of the water at room temperature was added and the lignin sulphonate solution added. The emulsion was passed through a 30 mesh screen and stored in polyethylene lined drums.

The emulsion of this example was diluted with equal parts of water and delivered to an application apparatus on a paper machine of the type adapted to apply bituminous emulsion to wet plies. The device for application is a wire covered cylinder immersed in a bath of the emulsion maintained at a constant level. The finished board made on the machine was tested after passing through the drying rolls and stacked in the usual manner. Examination of the sheet showed that the film had not migrated, and the plies adhered satisfactorily.

While emulsification in the example was accomplished on a Baker-Perkins mixer, other methods of mixing may be used, depending upon the viscosity and ease of emulsifying of the particular material. Vortex mixers, colloid mills and the like may also be used.

EXAMPLE II

A paste was prepared in a change can stirring apparatus from 40 parts of a kaolin clay (Crossman Clay Co.) to which a small amount of water had been added. The change can apparatus consisted of a rotating cylindrical metal container, inside which rotated a fork type stirrer. The stirrer was mounted so that its axis was displaced from the axis of the metal container. 200 parts polyethylene, mol wt. 4,000, S. P. 93° C. (Bakelite resin DYDT) was heated to 325° F. and 0.05% of an alkyl amine (Armeen H. T. D.) was added. The clay-water paste was maintained at 190° F. and the polyethylene was slowly run into the clay. Small amounts of water at 190° F. were added from time to time, the viscosity of the resulting emulsion being maintained as high as practical. When all the polyethylene had been added, the emulsion was diluted to a water content of 40%. It had a particle size which ranged from 2 to 100 microns and averaged 16 microns.

EXAMPLE III

The preceding preparation was repeated using in place of the polyethylene a microcrystalline wax, M. P. 150° F. Pen. 30 (Socony-Vacuum SV-2305) with 0.3% of Armeen H. T. D. An emulsion was obtained having a particle size ranging between 2 and 100 microns and averaging 25 microns.

EXAMPLE IV

As a further example, a master batch containing 80% polyisobutene (GRI-17) and 20% microcrystalline wax M. P. 180, Pen. 15 (Bareco Oil Co., Starwax 50) was prepared by charging 800 parts of the polyisobutene and 200 parts of the wax into a laboratory size Banbury mixer and mixing until thoroughly blended. A portion of this master batch weighing 250 parts was then placed in a Baker-Perkins mixer, and to this was slowly added 650 parts of the wax. The blend was melted by turning on the steam in the heating jacket of the mixer and 100 parts of a terpene resin (Piccolyte S-25, Pennsylvania Industrial Chemicals Corp.) was added. The blend was heated to 205° F. and 0.500 part of an amine (Armeen H. T. D.) was added. The mixer was stopped and a clap slip containing 200 parts of a kaolin clay (Crossman) in 450 parts boiling water was poured in. The mixer was then turned on and a crude emulsion was formed. Several minutes later when this emulsion appeared about ready to reinvert, as manifested by the appearance of strings of W/O emulsion, 400 parts of water at 210° F. was added over a period of seven minutes. The resulting emulsion had a particle size ranging between 5 and 100 microns and averaging 28 microns.

While in the above examples the cationic surface active agent has been added together with the material to be emulsified, the agent may be added in the clay slip, and this is particularly so in the case of those cationic surface active agents which are soluble.

While the applicant does not care to be limited to the explanation of the phenomenon, it is believed that the cationic surface active agent orients at the inter face of the material to be emulsified. The negative clay is then attracted to the positively charged material to be emulsified. The clay surrounds the material and prevents fusion of the particles thereof so that they may be more easily emulsified.

I claim:

1. An improved emulsifying agent comprising a negatively charged clay and a cationic surface active agent, the cationic surface active agent being present in the range 0.001 to 0.01 part per part of clay.

2. An improved emulsifying agent comprising bentonite clay and a cationic surface active agent, the cationic surface active agent being present in the range 0.001 to 0.01 part per part of clay.

3. An improved emulsifying agent comprising ball clay and a cationic surface active agent, the cationic surface active agent being present in the range 0.001 to 0.01 part per part of clay.

4. An improved emulsifying agent comprising kaolin clay and a cationic surface active agent, the cationic surface active agent being present in the range 0.001 to 0.01 part per part of clay.

5. An improved emulsifying agent comprising a negatively charged clay and a cationic surface active agent comprising a major portion of octa decyl amine, the cationic agent comprising about 0.2 part per 77 parts of clay.

References Cited in the file of this patent

UNITED STATES PATENTS

| 2,248,636 | Marsden | July 8, 1941 |
| 2,531,825 | Peterson et al. | Nov. 28, 1950 |
| 2,652,341 | Craig | Sept. 15, 1953 |